Figure 1:
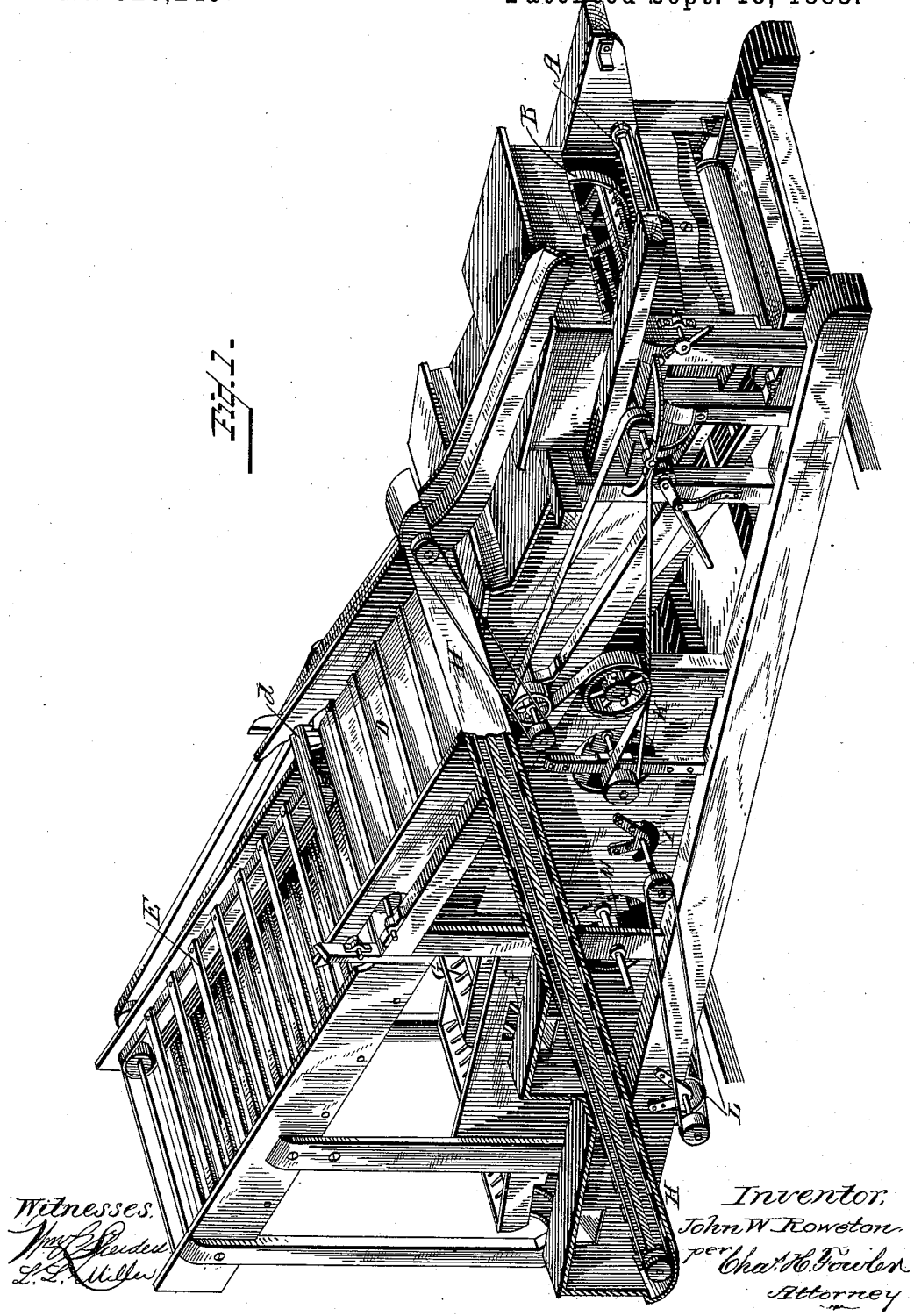

(No Model.) 4 Sheets—Sheet 1.

J. W. ROWETON.
THRASHING MACHINE.

No. 326,249. Patented Sept. 15, 1885.

Witnesses.

Inventor,
John W. Roweton
per Chas. H. Fowler
Attorney (No Model.)  J. W. ROWETON.  4 Sheets—Sheet 3.
THRASHING MACHINE.

No. 326,249. Patented Sept. 15, 1885.

Witnesses.

Inventor,
John W. Roweton.
per
Chas. H. Foster
Attorney (No Model.) 4 Sheets—Sheet 4.

J. W. ROWETON.
THRASHING MACHINE.

No. 326,249. Patented Sept. 15, 1885.

Witnesses  
Inventor  
John W. Roweton.  
per Chas. H. Fowler,  
Attorney

UNITED STATES PATENT OFFICE.

JOHN WESLEY ROWETON, OF CLARKSBURG, OHIO.

THRASHING-MACHINE.

SPECIFICATION forming part of Letters Patent No. 326,249, dated September 15, 1885.

Application filed April 29, 1885. (No model.)

*To all whom it may concern:*

Be it known that I, JOHN W. ROWETON, a citizen of the United States, residing at Clarksburg, in the county of Ross and State of Ohio, have invented certain new and useful Improvements in Thrashing-Machines; and I do hereby declare that the following is a full, clear, and exact description of the same, reference being had to the annexed drawings, making a part of this specification, and to the letters and figures of reference marked thereon.

The present invention consists in certain new and useful improvements in thrashing-machines, substantially as shown in the drawings, and hereinafter described and claimed.

Figure 2:
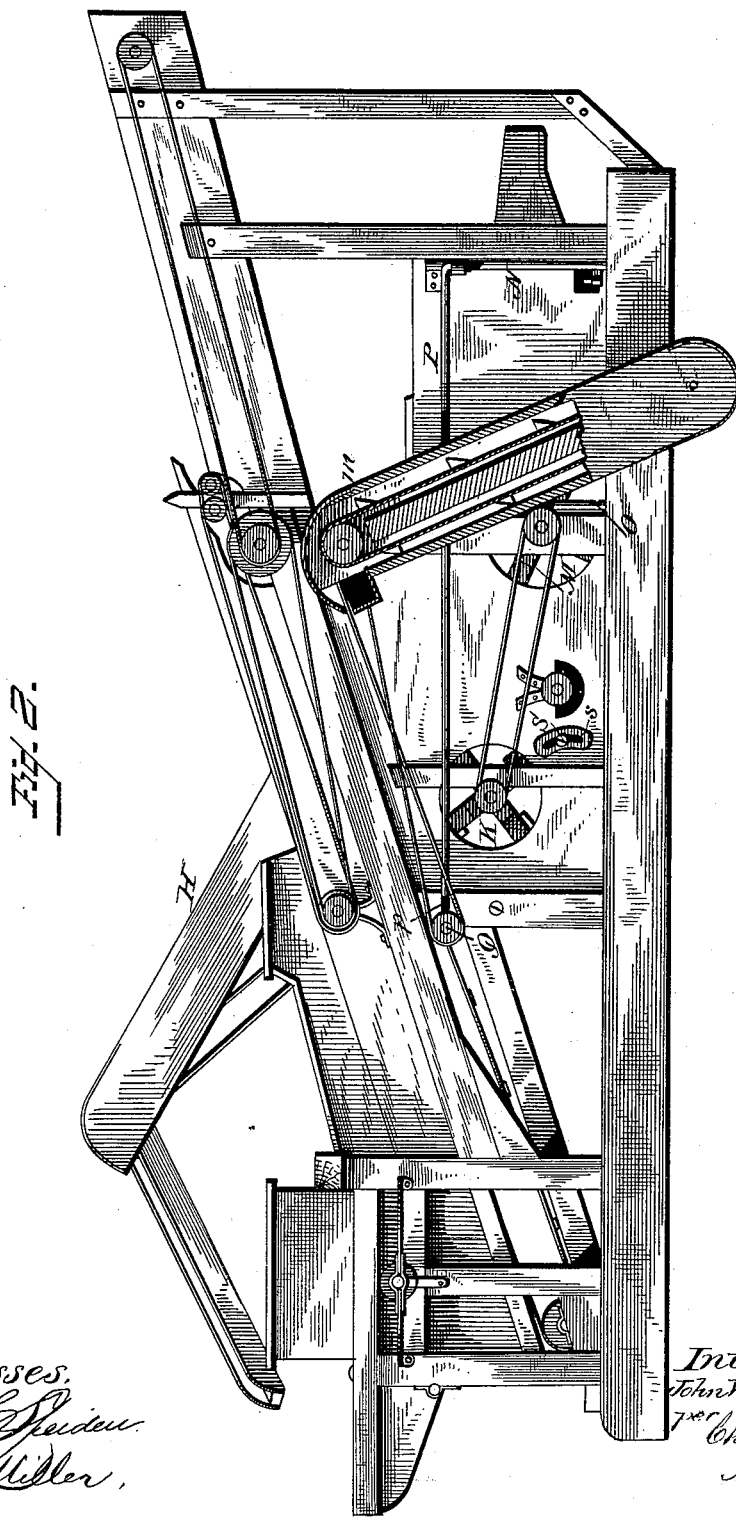
Figure 3:
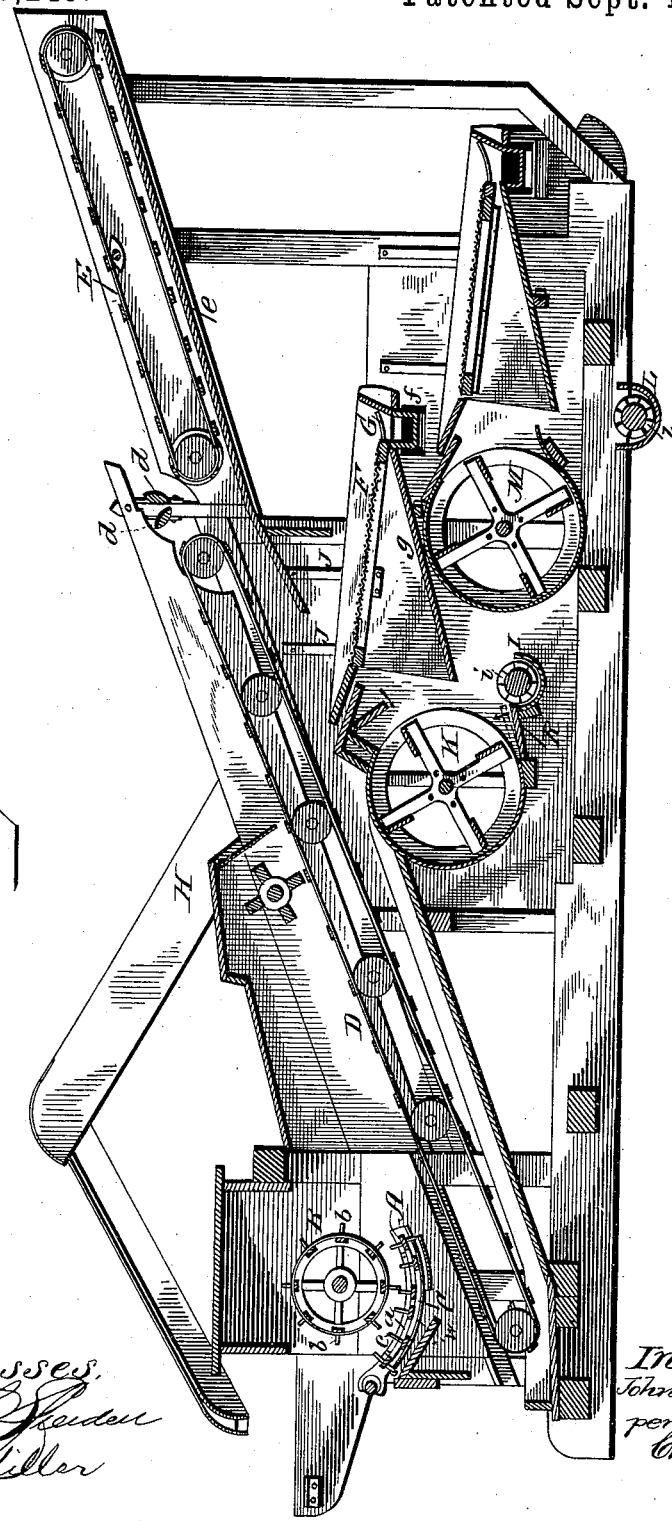
Figure 4:
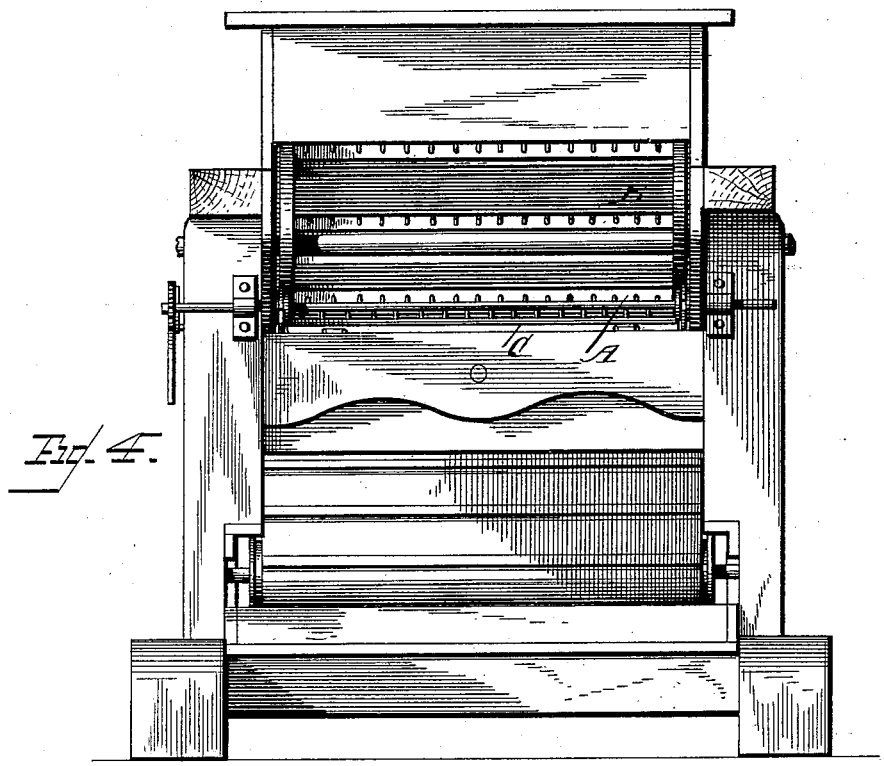
Figure 5:
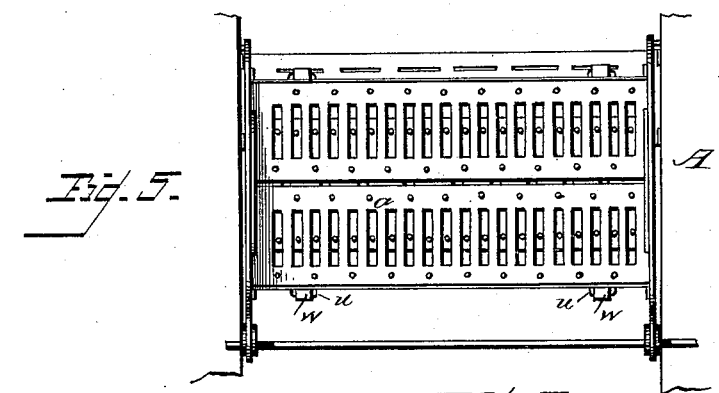
Figure 6:
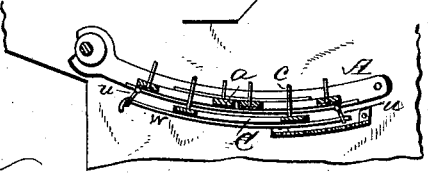

In the drawings, Figure 1 is a perspective view of my machine; Fig. 2, a side elevation of the side opposite to that shown in Fig. 1, and Fig. 3 is a vertical longitudinal section thereof; Fig. 4, an end view, and Figs. 5 and 6 are respectively detail plan and transverse sectional views of the concave.

The framing of my machine may be modified or varied at will, and I will not enter into any detailed description thereof.

The concave A is located near the front of the machine, and above it is journaled the cylinder B. This concave is formed with the usual upper plate, *a*, having slots and teeth, and a second plate, C, located below the plate *a*, and having teeth *c* which project up through the slots in the plate *a*. This plate C is supported below the plate *a* by hangers *w*, which are hooked at their ends to engage with loops *u* depending from the plate, by which means the hangers are held in position, as shown in Fig. 5.

The construction of the concave as above described enables the wheat to be thoroughly separated, the wheat, straw, &c., dropping from the concave onto the endless carrying-apron D, by which it is carried upward, and the straw is delivered onto a slatted carrier, E.

Between the two carriers I arrange one or more agitators or shaking-shafts, *d d*, which serve to shake the straw and prevent any grain being secured by the massing or bunching of the straw. A carrying-board, *e*, inclines toward its forward end, below this upper carrier, E, and the grain drops from said carrier onto the platform, and is delivered thereby onto the first or forward riddle, F. This riddle opens at its rear or lower end into a gutter or spout, *f*, and is provided with teeth or fingers G, which project over such spout, and operate to prevent straw and the like from passing thereinto, while the tailings or imperfectly-thrashed heads of grain pass through. This gutter *f* discharges them at one side into the main or return elevator H, located alongside the machine, as shown.

Below the sieve of the riddle I arrange a receiving-board, *g*, which extends at its rear upper end to and under the rear end of such sieve, and is inclined thence forward under such sieve, and has its lower front end arranged in position to discharge into a transverse trough, I, having a suitable screw or other conveyer, *i*, whereby the good grain deposited therein may be fed to one or the other side of the machine.

I support the riddle F on hangers J, so it can be vibrated laterally by the mechanism hereinafter described.

In front of the riddle F and conveyer *i* I arrange a fan, K, whereby chaff, &c., is blown out of the wheat, and the latter reaches the conveying-trough free of all undesirable matter.

A second riddle, constructed and supported similarly to the riddle F, is located in rear of and slightly below such riddle, as most clearly seen in Fig. 3. The tailings-gutter of this last riddle also discharges into the return-elevator H and a conveyer-trough, and conveyer L *l* is suitably located to receive the good grain screened through by this second riddle.

A fan, M, is also arranged in front of this second riddle, for the purpose of blowing all impurities out of the grain before it reaches the conveyer-spout. This rear conveyer discharges into the case of an elevator, *m*, and is carried up and discharged onto the front or main riddle and again run over the said main riddle.

The several shafts of the machine are geared together by belts or in other suitable manner.

Shafts N O are journaled to the machine, as shown in Fig. 2, and are each provided with two cranks, one of which is connected by suitable links with the front and rear riddles, and the others of which are connected with a pitman, P, which connects with and receives motion from a crank, p, on a shaft, Q, geared with the other shafts of the machine. The cranks of the shafts N O are so arranged as to vibrate the two riddles reciprocally, and so obviate in great part the vibration and shaking of the machine.

The riddle-shoes, as will be seen, are arranged one below and in rear of the other, and the tailings-return elevator arranged disposed at an inclination corresponding with the arrangement of the shoes and receiving the tailings from each.

Instead of elevating the grain screened by the second onto the first riddle, such grain might be independently discharged and the thrashings be taken in two grades.

Ordinarily I do not employ so strong a fan-blast on the second as on the first or main riddle, in order to avoid the blowing off of the imperfectly-thrashed heads, &c., which are discharged into elevator H and again run through the machine.

A board, R, extends between the fan K and riddle, and is pivoted or hinged at its edge next the fan, so its other edge can be adjusted to direct the blast from the fan. This edge of the board may be held at any desired point by a set-screw, S, which operates through a slot, s, in the side of the machine, as shown in Fig.2.

Having thus described my invention, what I claim, and desire to secure by Letters Patent, is—

1. In a thrashing-machine, the combination of the thrashing-cylinder, the carriers, the riddle-shoes, one arranged below and in rear of the other, and the tailings-conveyers thereof, of a tailings-return elevator arranged at an inclination corresponding with the arrangement of the shoes and receiving the tailings from each, substantially as and for the purpose set forth.

2. In a thrashing-machine, the combination, with the cylinder thereof, of the concave consisting of an upper toothed and slotted plate and a lower plate having teeth projecting up through the slots, and hooked hangers engaging with loops on the upper plate to form supports for the lower one, substantially as and for the purpose specified.

In testimony that I claim the above I have hereunto subscribed my name in the presence of two witnesses.

JOHN WESLEY ROWETON.

Witnesses:
JOHN L. JOHNSON,
J. W. GOLDSBERRY.